E. ANDREWS.

SAW HANDLE.

No. 10,135. Reissued June 13, 1882.

WITNESSES:

J. E. Clark

M. J. Blagett

INVENTOR:

Emanuel Andrews by Geo. W. Dyer

Attorney.

N. PETERS, Photo-Lithographer, Washington, D. C.

UNITED STATES PATENT OFFICE.

EMANUEL ANDREWS, OF WILLIAMSPORT, PENNSYLVANIA.

SAW-HANDLE.

SPECIFICATION forming part of Reissued Letters Patent No. 10,135, dated June 13, 1882.

Original No. 159,140, dated January 26, 1875. Application for reissue filed March 11, 1882.

*To all whom it may concern:*

Be it known that I, EMANUEL ANDREWS, of Williamsport, in the county of Lycoming and State of Pennsylvania, have invented a new and useful Improvement in Saw-Handles; and I do hereby declare that the following is a full and exact description of the same, reference being had to the accompanying drawings, and to the letters marked thereon.

The object of my invention is, first, to strengthen the handle to the ordinary handsaw, particularly in the weakest portions of the same; and, secondly, to avoid the breaking off of the horns of the handle; and it consists in the combination of devices employed to effect such purposes, as hereinafter set forth.

In order to enable those skilled in the art to make and apply my handles to saws, I proceed to describe the same in connection with the drawings, in which—

Figure 1:
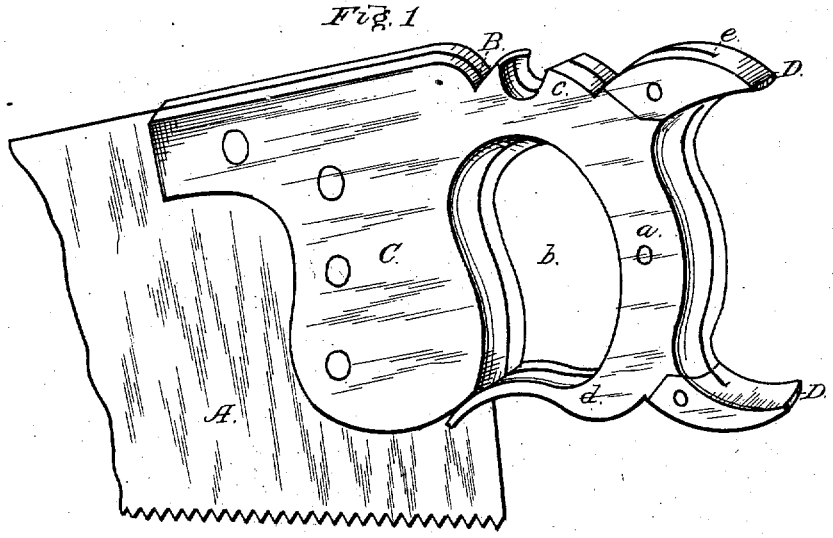
Figure 2:
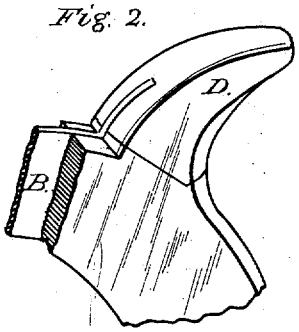
Figure 3:
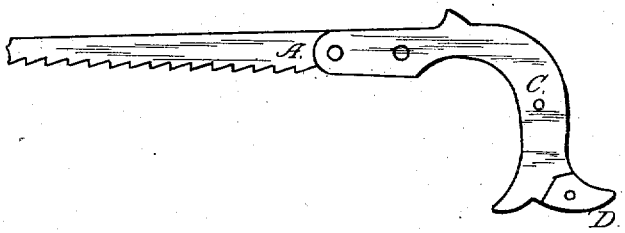
Figure 4:
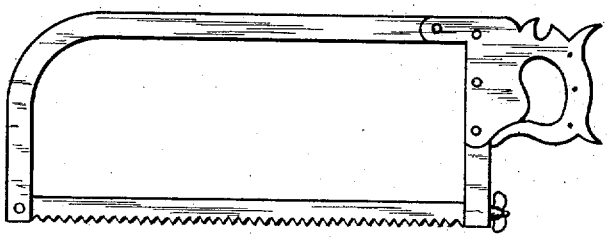
Figure 5:
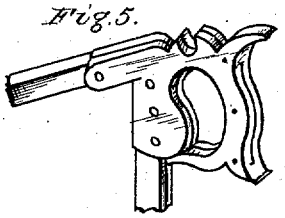

Figure 1 is a view, partly in perspective, of my saw-handle, of any ordinary style, as applied to a common handsaw; Fig. 2, a separate view of one of the tips or horns; Fig. 3, an application of my handle to ordinary small light or compass saws; Fig. 4, an application of my handle to meat-saws, and Fig. 5 a perspective view of the handle shown in Fig. 4.

Like letters denote corresponding parts in each figure.

In the drawings, A denotes the cutting portion of the blade; B, the butt of the same, cut away in such a manner as to conform to the general contour of the grip *a* of the handle C, and also to the general contour of the grip-opening *b*, and to the portions of the handle above and below said grip-opening, (marked respectively *c* and *d*.)

The handle may be made in two pieces; but I prefer to make it of a single piece, and have the same sawed vertically from the front to a point at or near the position marked *e* in Fig. 1. Being so sawed, the handle is slipped upon the previously-prepared butt B and securely fastened to the same. The handle then will be upon the rear end of the saw-blade, with the grip and the grip-opening below the upper line of the same and nearly at right angles to the line of the saw-blade, and the handle will be strengthened in the line of greatest strain, where it most needs strength. The handsaw will then resemble the ordinary ones in market, except that it will have a central film of steel in its handle. Upon these handles I put horns D, of cast gutta-percha, hard rubber, or paper, or of rubber filled with paper or other suitable material capable of being compressed into a hard-rubber exterior or case, the saw-horns being dovetailed into the handle or secured thereto in any proper manner. It will be found that such horns or tips will resist fracture, and be light and convenient in use and ornamental in appearance. In the instance shown in Fig. 3 there is no departure from the principle of my invention, the butt of the saw-blade being made to conform substantially to a central section of the particular handle. In the instance shown in Fig. 4 the butt of the blade is first secured to the rigid frame of the saw, and that part in the center of the handle is cut away to conform substantially to the central section of the same.

I do not wish to be confined to a film of steel composing the butt of a saw-blade, so arranged as to compose the center of the saw-handle throughout every part of it and conform to the principal external and internal outlines of the same, as I do not regard such a construction and arrangement as the cardinal idea of my invention, which I conceive rather to be the strengthening of the ordinary single-handed saw by extending the saw-blade into the weakest parts of the same, always preferring, however, that such extension shall embrace the entire grip-opening of the same.

Having thus described my invention and pointed out some of its advantages, what I claim as new therein is—

1. In combination with a grip-saw handle, the saw-blade extended centrally into the same to or beyond the grip-opening, for strengthening the handle, as set forth.

2. In a grip-saw wherein the blade extends centrally into the grip-handle for strengthening the same, the construction of the blade-butt, as described, whereby it is made to coincide in contour with that of the handle, as set forth.

3. In combination with a handsaw-handle, the saw-blade extending centrally through the same and conforming to the outlines thereof, substantially as described and shown.

4. In a saw-handle, the tips or horns D, substantially as described and shown.

Witnesses: EMANUEL ANDREWS.
C. E. CLINE,
WILLIAM T. ANDREWS.